United States Patent
Rogers

(10) Patent No.: US 6,240,523 B1
(45) Date of Patent: May 29, 2001

(54) METHOD AND APPARATUS FOR AUTOMATICALLY DETERMINING THE PHASE RELATIONSHIP BETWEEN TWO CLOCKS GENERATED FROM THE SAME SOURCE

(75) Inventor: Paul L. Rogers, Cupertino, CA (US)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/365,055

(22) Filed: Jul. 30, 1999

(51) Int. Cl.[7] ....................................... G06F 1/04
(52) U.S. Cl. ..................... 713/400; 713/503; 713/600
(58) Field of Search .................... 713/400, 401, 713/500, 501, 600, 503

(56) References Cited

U.S. PATENT DOCUMENTS

| | | | |
|---|---|---|---|
| 5,870,446 | * 2/1999 | Mahan et al. | 375/371 |
| 5,905,391 | * 5/1999 | Mooney | 327/161 |
| 6,005,412 | * 12/1999 | Ranjan et al. | 326/63 |
| 6,115,322 | * 9/2000 | Kanada et al. | 365/233 |

* cited by examiner

*Primary Examiner*—Dennis M. Butler
(74) *Attorney, Agent, or Firm*—David A. Plettner

(57) ABSTRACT

A method and apparatus automatically determines a phase-based relationship between two clocks generated from the same source. In accordance with the present invention, a clock generator provides a clock signal to a sending IC and a receiving IC. The sending IC transmits data to the receiving IC over a data bus, and provides a strobe signal that is delayed by ¼ of a cycle of the internal clock of the sending IC to validate data at the receiving IC. The phase relationship between the strobe signal and the internal clock of receiving IC is initially unknown. Within the receiving IC, the strobe signal is used to form four round robin clock signals that clock data into four flip flops using a round robin scheme. Each of the round robin flip flops has a valid read window, and pair of multiplexors route the outputs of the round robin flip flops to a pair of flip flops that are clocked using internal clocks of the receiving IC. A select signal in the clock domain of the receiving IC is provided to the pair of multiplexors. The select signal can have one of two possible orientations. A phase detection circuit compares the phase of the select signal in the clock domain of the receiving IC with one of the round robin clock signals in the clock domain of the sending IC. If the phase detection circuit determines that the phase of the select signal has the proper, then the phase detect circuit does not toggle the orientation of the select signal. However, if the phase detection circuit determines that the select signal has an incorrect orientation, then the select signal is delayed for ½ of a cycle of the select signal, thereby establishing the proper orientation of the select signal.

23 Claims, 7 Drawing Sheets

METHOD AND APPARATUS FOR AUTOMATICALLY DETERMINING THE PHASE RELATIONSHIP BETWEEN TWO CLOCKS GENERATED FROM THE SAME SOURCE

FIELD OF THE INVENTION

The present invention relates to clocking data in digital systems. More specifically, the present invention relates to the determination of phase-based relationships between two clocks having the same frequency, but initially unknown phase-based relationships.

DESCRIPTION OF THE RELATED ART

In the art of digital signal processing, which of course includes the art of computing, it is common to clock data from one integrated circuit (the sending IC) to another IC (the receiving IC) using a clock signal generated externally from both ICs. Often the sending IC will also produce a strobe signal that is delayed by ¼ of a cycle from the internal clock of the sending IC so that the data transmitted by the sending IC can be validated at the receiving IC. While the data from the sending IC is easily captured at the receiving IC using the strobe signal produced by the sending IC, the receiving IC must then shift the data from the clock domain of the sending IC to its own clock domain to continue processing the data. While the clocks within the sending and receiving ICs are the same frequency, the phase relationship between the clocks is initially unknown because of clock skew, the ¼ cycle delay, and other factors.

One prior art method of shifting data from one clock domain to another is to sequentially clock data from the sending IC into a series of flip flops using a round robin scheme, and holding each data bit at a flip flop for a longer period of time. For example, consider a strobe signal from the sending IC that indicates valid data on both the rising and falling edges (which will generically be referred to as validation edges), and a single data input pad coupled to four flip flops. Each flip flop is clocked by signal running at ¼ the frequency of the validation edges of the strobe signal from the sending IC, and the clock of each flip flop is delayed by one validation edge with respect the flip flop logically adjacent to it. In such an arrangement, the first, fifth, and ninth bits will be received at the first flip flop, the second, sixth, and tenth bits will be received at the second flip flop, and so on. Since each bit is held within each flip flop for four validation edges, it is easier to select one of the clock edges of the receiving IC's clock to validate the incoming data bit and transfer the data bit from the sending IC's clock domain to the clock domain of the receiving IC.

While using such a round robin scheme eases the problem of transferring the data bit from the sending IC's clock domain to the clock domain of the receiving IC, the receiving IC must still have some method of determining which flip flop to read data from for any given clock cycle. In the example above, for a given validation edge of the receiving ICs clock, the data is typically more centered and best validated at one of two possible flip flops. Accordingly, a select signal is required to determine which flip flop to read for any given validation edge of the clock of the receiving IC.

In the prior art, this select signal was typically selected using a master IC. The master IC contained a series of registers that stored the proper orientation of select signals for the ICs on the board. A designer would design the logic circuit, and when the design was nearing conclusion, would perform timing simulations for the complete system. Based on the timing simulations, the proper values would be loaded into the registers of the master IC to provide the proper select signal orientation to the other ICs. If it turned out that the simulations were not accurate, or subsequent modifications were made to the board which altered clock skew, the select signal orientations could easily be changed by reloading the registers of the master IC.

While the master IC works well, programming it requires extra simulation steps and subsequent debugging. In addition, using a master IC can consume many I/O pins. Note that a select signal is required for each strobe signal provided by another IC. Therefore, if an IC is designed to receive strobe signals from twelve other ICs, twelve I/O pins are required. Unfortunately, in the art of integrated circuit design increases in transistor density are not matched by corresponding increases in I/O pin density. Accordingly, it is becoming increasing difficult to dedicate so many I/O pins to select signals. Therefore, any method or apparatus that would allow an IC to generate its own select signal would be highly desirable. Some of the simulation steps required during design can be eliminated, I/O pin count would be reduced (or I/O pins would become available for other functions), and system debugging would be simplified, thereby reducing time to market and cost for a given design.

SUMMARY OF THE INVENTION

The present invention provides a method and apparatus for automatically determining a phase-based relationship between two clocks generated from the same source. In accordance with the present invention, a clock generator provides a clock signal to a sending IC and a receiving IC. The sending IC transmits data to the receiving IC over a data bus, and provides a strobe signal that is delayed by ¼ of a cycle of the internal clock of the sending IC to validate data at the receiving IC. Because of clock skew, the ¼ cycle delay, and other factors, the phase relationship between the strobe signal and the internal clock of receiving IC is initially unknown.

Within the receiving IC, the strobe signal is used to form four round robin clock signals. Each of the four round robin clock signals has a falling edge once every two cycles of the strobe signal. However, each of the four round robin clock signals is offset from the round robin clock signal logically adjacent to it by ½ of a cycle of the strobe signal. The round robin clock signals are used to clock data into four flip flops using a round robin scheme. For example, if the first flip flop captures the first, fifth, and ninth bits, the second flip flop will capture the second, sixth, and tenth bits, the third flip flop will capture the third, seventh, and eleventh bits, and the fourth flip flop will capture the fourth, eighth, and twelfth bits.

Each of the round robin flip flops has a valid read window. A pair of multiplexors route the outputs of the round robin flip flops to a pair of flip flops that are clocked using internal clocks of the receiving IC, thereby transferring the incoming data from the clock domain of the sending IC to the clock domain of the receiving IC.

A select signal in the clock domain of the receiving IC is provided to the pair of multiplexors. The select signal can have one of two possible orientations. If the orientation is correct, each round robin flip flop will be read at least ¼ and no more than ¾ of the way into the read window of that flip flop, thereby resulting in a valid. read. However, if the orientation signal is incorrect, a read error may occur, resulting in data corruption.

To ensure that the select signal has the proper orientation, a phase detection circuit compares the phase of the select signal in the clock domain of the receiving IC with one of the round robin clock signals in the clock domain of the sending IC. The phase detection circuit begins detecting the phase relationship after a power-on reset signal is deasserted. The power-on reset signal is asserted when a computer is powered on, and is deasserted a sufficient time after the power supples have reached stable voltage levels.

If the phase detection circuit determines that the phase of the select signal has the proper orientation with respect to the phase of the round robin clock signal, then the phase detect circuit does not toggle the orientation of the select signal. However, if the phase detection circuit determines that the select signal has an incorrect orientation, then the select signal is delayed for ½ of a cycle of the select signal, thereby establishing the proper orientation of the select signal.

At some point after the deassertion of the power-on reset signal, a system reset signal is deasserted. When the system reset signal is deasserted, the phase detection circuit locks in the orientation of the select signal, thereby preventing later disruption of the round robin scheme, which would occur if the orientation were later toggled.

The present invention provides a simple and automatic way of determining a phase-based relationship between a strobe signal provided by a sending IC and the internal clock of a receiving IC, thereby facilitating the transfer of data from the clock domain of the sending IC to the clock domain of the receiving IC. By eliminating the master IC used in the prior art, the component count is reduced, I/O pin count is reduced (or I/O pins become available for other functions), circuit board trace routing is simplified, simulation steps required during design can be eliminated, and system debugging is simplified, thereby decreasing time to market and reducing cost.

DETAILED DESCRIPTION OF THE PREFERRED EMBODIMENTS

Figure 1:
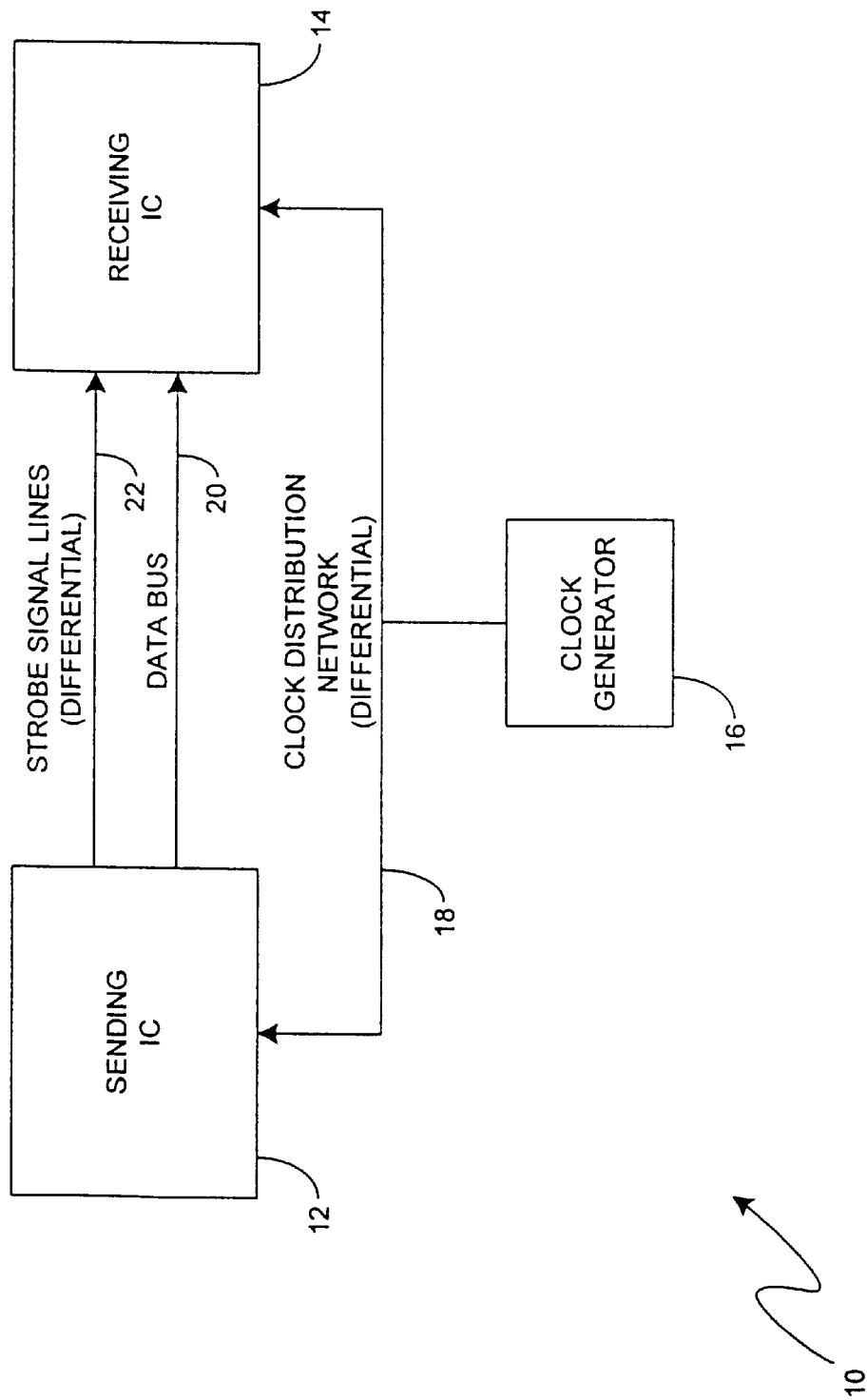
FIG. 1 is a block diagram of a digital system that will be used to describe the present invention.

FIG. 1 is a block diagram of system 10, which will be used to describe the present invention. Obviously an actual digital system would be much more complex. However, system 10 is more than adequate to facilitate an understanding of the present invention.

System 10 includes a sending integrated circuit (IC) 12, a receiving IC 14, and a clock generator 16. Clock generator 16 provides a differential clock signal to ICs 12 and 14 via clock distribution network 18.

Sending IC 12 transmits data to receiving IC 14 via data bus 20. As is known in the art, data busses typically carry a plurality of data signals simultaneously on a plurality of bus conductors. However, to simplify the presentation of the present invention below only a single conductor of data bus 20 will be discussed. In order to validate at receiving IC 14 the data carried by data bus 20, sending IC 12 also provides a differential strobe signal on strobe signal lines 22 that is delayed by ¼ of a cycle of the internal clock of sending IC 12.

As discussed above in the section entitled "Description of the Related Art", the internal clock of receiving IC 14 will have the same frequency as, but an initially unknown phase relationship with respect to, the clock carried on strobe signal lines 22. Accordingly, receiving IC 14 must shift the incoming data from the clock domain of the differential clock carried by strobe signal lines 22 to the clock domain of receiving IC 14. This is done by sequentially clocking received data from sending IC 12 into a series of flip flops of receiving IC 14 using a round robin scheme, and holding each data bit at a flip flop for a longer period of time.

Figure 2:
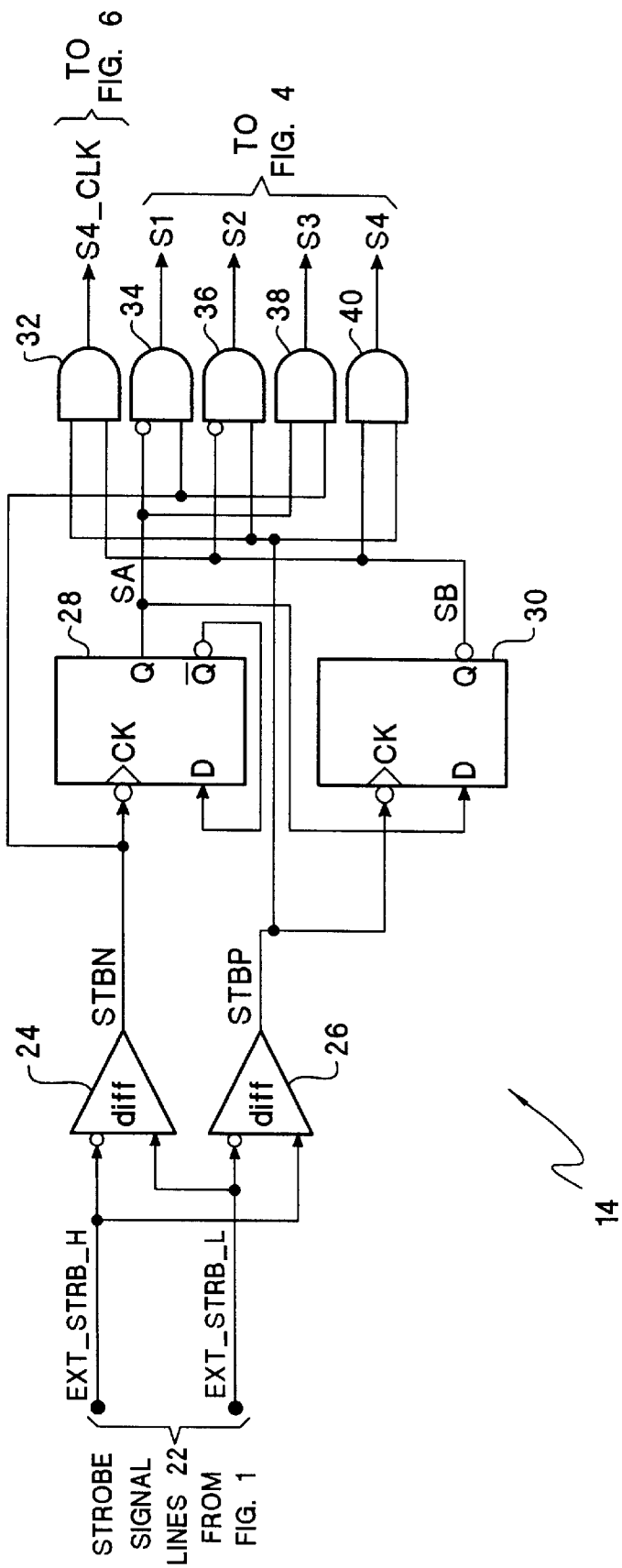
FIG. 2 is a block diagram of a portion of a receiving integrated circuit (IC) shown in FIG. 1 that generates four flip flop clock signals based on a differential signal carried by strobe signal lines that are provided by a sending IC shown in FIG. 1.

FIG. 2 is a block diagram of the portion of IC 14 that generates four flip flop clock signals based on the signal carried by strobe signal lines 22 of FIG. 1. The portion of IC 14 shown in FIG. 2 includes differential receivers 24 and 26, flip flops 28 and 30, and AND gates 32, 34, 36, 38, and 40.

Figure 3:
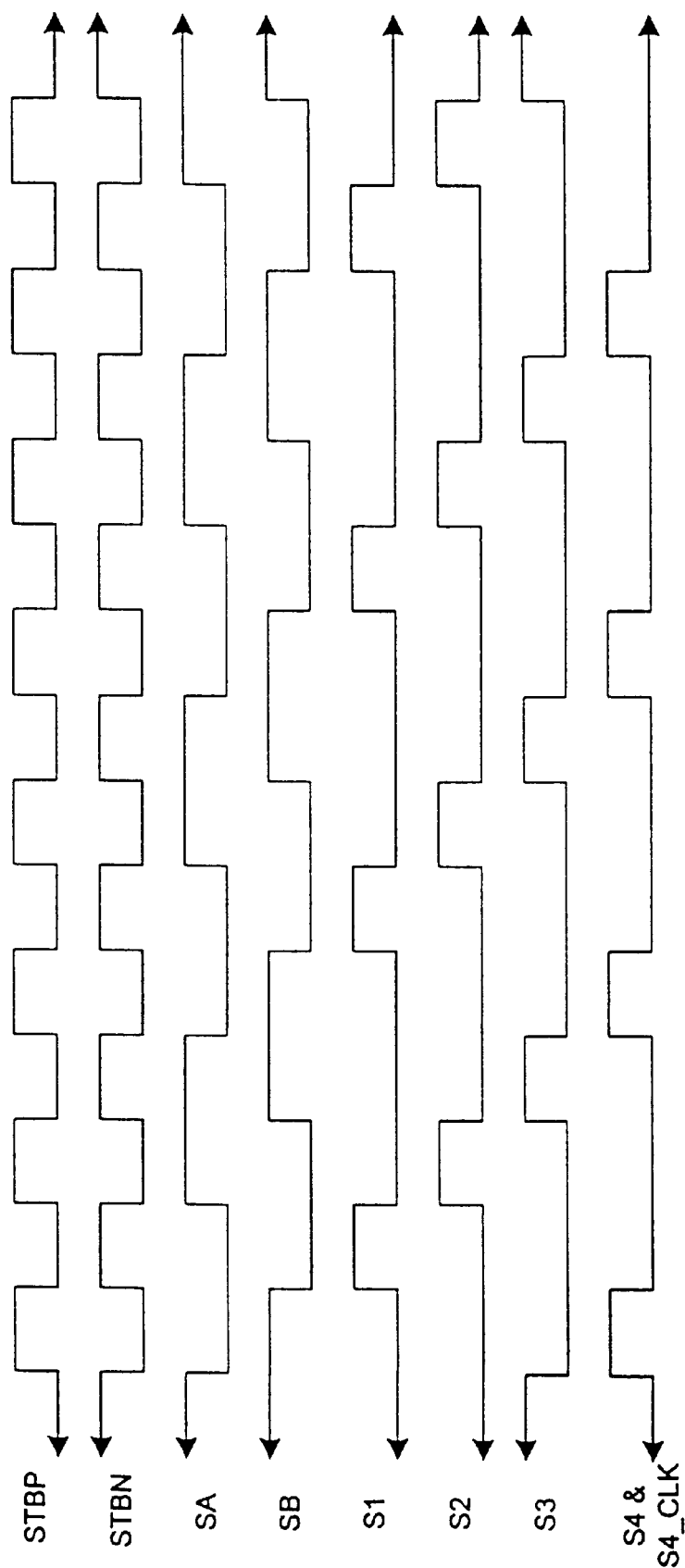
FIG. 3 is a timing diagram that shows timing relationships between some of the signals present input shown in FIG. 2.

The signals EXT_STRB_H and EXT_STRB_L are received from strobe signal lines 22 of FIG. 1, and are provided to differential receivers 24 and 28 to produce differential signals STBN and STBP. Signals STBN and STBP are shown in FIG. 3. Flip flop 28 is configured to receive the signal STBN at its CK input and produce an intermediate signal SA, which is the signal STBN divided by two. Intermediate signal SA is shown in FIG. 3. Signal SA is provided to the D input of flip flop 30, which is clocked at its CK input by the signal STBP, thereby producing intermediate signal SB. Intermediate signal SB is shown in FIG. 3, and is a copy of the signal SA delayed by one validation cycle of the signals STBP and STBN. Note that as used herein, the term "validation cycle" refers to the period between validation edges. Accordingly, in the signals STBP and STBN, a validation cycle occurs every rising and falling edge. In contrast, the term "cycle" used along will refer to the period between repeating parts of the waveform. Accordingly, each "cycle" of the signals STBP and STBN contains two "validation cycles".

AND gates 32, 34, 36, 38, and 40 gate together various combinations of the signals STBP, STBN, SA, and SB to form clock signals S1, S2, S3, S4, and S4_CLK. Note that clock signals S4 and S4_CLK are the same logical signal. Signals S1, S2, S3, and S4 (and S4_CLK) are shown in FIG. 3. Note that each of the four clock signals has a falling edge once every two cycles (or once every four validation cycles) of the signals STBP and STBN. However, each of the four clock signals is offset from the clock signal logically adjacent to it by one validation cycle of the signals STBP and STBN. Accordingly, clock signals S1, S2, S3, and S4 are used to clock the flip flops that are part of the round robin scheme described above. These four flip flops are shown in FIG. 4.

Figure 4:
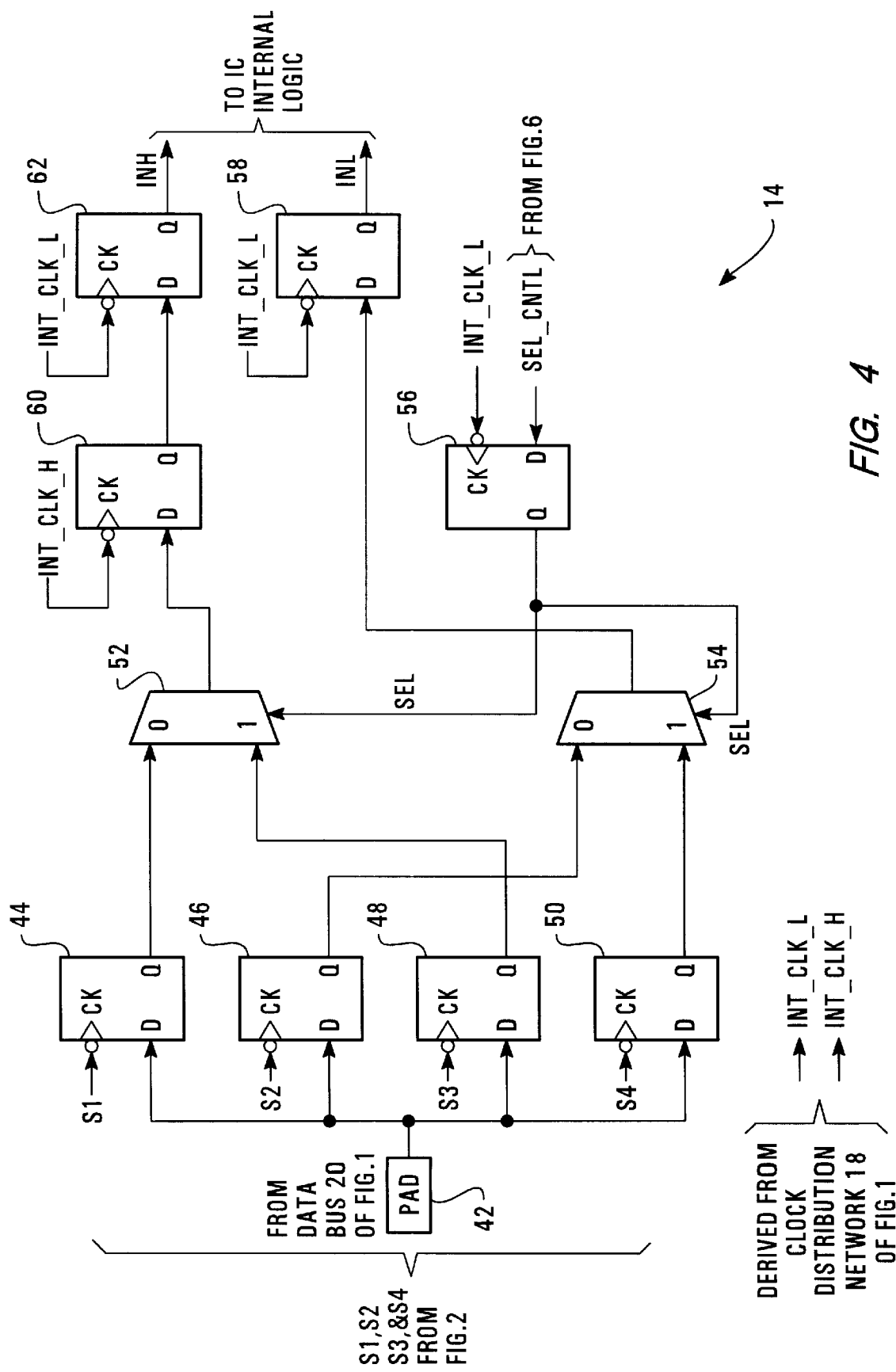
FIG. 4 is a block diagram showing a portion of the receiving IC that transfers received data from the clock domain of a sending IC to the clock domain of the receiving IC.

FIG. 4 is a block diagram showing the portion of IC 14 that transfers received data from the clock domain of sending IC 12 to the clock domain of receiving IC 14. The portion of IC 14 shown in FIG. 4 includes pad 42, flip flops 44, 46, 48, 50, 56, 58, 60, and 62, and multiplexors 52 and 54. Note that the internal clock signals INT_CLK_L and INT_CLK_H are derived from clock distribution network 18 of FIG. 1. Accordingly, the signals INT_CLK_L and INT_CLK_H have the same frequency as, but an initially unknown phase relationship with respect to, the signals STBN and STBP.

One conductor of data bus 20 of FIG. 1 is coupled to pad 42, and pad 42 is coupled to the D inputs of flip flops 44, 46, 48, and 50. The CK input of flip flop 44 is connected to signal S1, the CK input of flip flop 46 is connected to signal S2, the CK input of flip flop 48 is connected to signal S3, and the CK input of flip flop 50 is connected to signal S4. Accordingly, each flip flop captures every fourth bit arriving at pad 42. For example, if flip flop 44 captures the first, fifth, and ninth bits, flip flop 46 will capture the second, sixth, and tenth bits, flip flop 48 will capture the third, seventh, and eleventh bits, and flip flop 50 will capture the fourth, eighth, and twelfth bits.

As will be seen below with reference to FIG. 5, the falling edge of clock INT_CLK_H will line up with a valid read window of either flip flop 44 or 48. Likewise, the falling edge of clock INT_CLK_L will line up with a valid read window of either flip flop 46 or 48. The signal SEL determines which flip flops to read, and is provided to multiplexors 52 and 54. Note that the signal SEL is derived from the signal SEL_CNTL from FIG. 6 by synchronizing SEL_CNTL with the signal INT_CLK_L at flip flop 50. The signal SEL_CNTL will be discussed below with reference to FIG. 6.

Every falling edge of the signal INT_CLK_L, flip flop 58 reads the output of multiplexor 54 to form the signal INL. Likewise, every falling edge of the signal INT_CLK_H, flip flop 60 reads the output of multiplexor 52, and flip flop 62 synchronizes the output of flip flop 60 with the falling edge of INT_CLK_L to form the signal INL. Accordingly, at every falling edge of INT_CLK_L, two bits are available at signals INH and INL. These signals represent data bits that have been transferred from the clock domain of sending IC 12 at pad 42 to the clock domain of receiving IC 14. These signals are provided to internal logic of IC 14 for further processing, and are not relevant to the continued discussion of the present invention.

Figure 5:
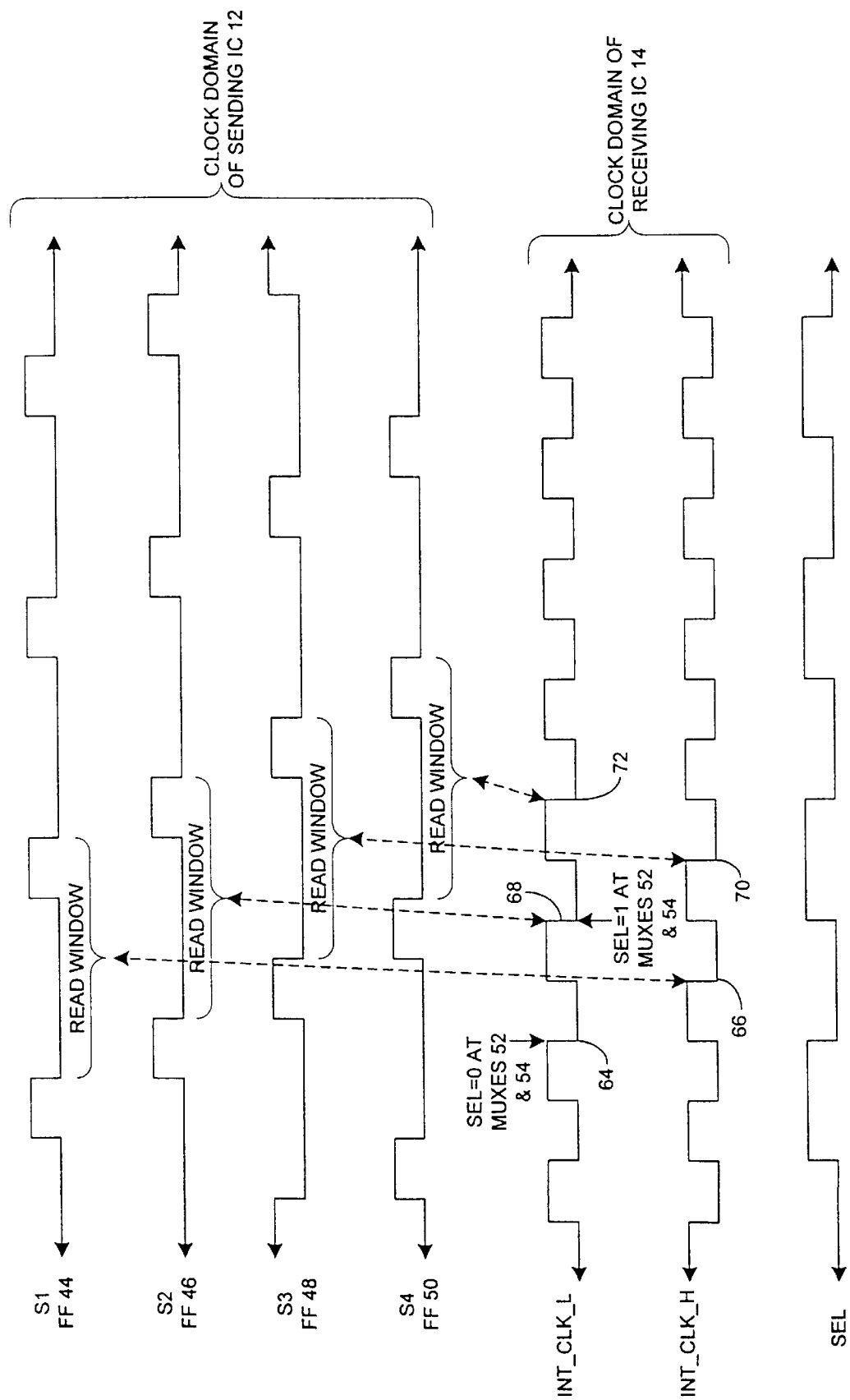
FIG. 5 is a timing diagram that shows timing relationships between some of the signals present in the circuit shown in FIG. 4.

FIG. 5 shows several timing diagrams that illustrate the operation of the portion of IC 14 shown in FIG. 4. Clock signals S1, S2, S3, and S4, which are provided to flip flops 44, 46, 48, and 50, respectively, are in the clock domain of sending IC 12. Clock signals INT_CLK_L and INT_CLK_H are in the clock domain of receiving IC 14. As mentioned above, the phase relationship between the two clock domains is not initially known.

A valid read window is shown for each of the flip flops. To properly transfer the incoming data from the clock domain of sending IC 12 to the clock domain of receiving IC 14, it is desirable to read the data from the flip flops near the centers of the read windows. To see how this is done, assume that the SEL signal from flip flop 56 becomes "0" at edge 64 of signal INT_CLK_L. Thereafter, flip flop 60 will read data from multiplexor 52 at edge 66 of signal INT_CLK_H. Since the signal SEL is "0", the data will be provided by flip flop 44. Note that edge 66 is well centered in the read window of flip flop 44.

At edge 68 of signal INT_CLK_L, flip flop 58 will read data from multiplexor 54. Since the signal SEL is still "0", the data will be provided by flip flop 46. Note that edge 68 is well centered in the read window of flip flop 46.

The signal SEL then changes from "0" to "1" at edge 68. Thereafter, flip flop 60 will read data from multiplexor 52 at edge 70 of signal INT_CLK_H. However, since the signal SEL is now "1", the data will be provided by flip flop 48. Note that edge 70 is well centered in the read window of flip flop 48. Likewise, at edge 72 of signal INT_CLK_L, flip flop 58 will read data from multiplexor 54. Since the signal SEL is now "1", the data will be provided by flip flop 50. Note that edge 72 is well centered in the read window of flip flop 50.

As can be seen in FIG. 5, the orientation of signal SEL with respect to the clock domain of sending IC 12 (signals S1, S2, S3, and S4) is critical. In FIG. 5, if the signal SEL is inverted, then flip flop 60 would read flip flop 48 at edge 66 and read flip flop 44 at edge 70, and flip flop 58 would read flip flop 50 at edge 68 and read flip flop 46 at edge 72. Note that each of these edges is not well centered with respect to the read window of the flip flop being read. Accordingly, data read errors may occur. Therefore, it is essential to establish the proper orientation of the SEL signal with respect to the clock domain of the sending IC. In essence, the orientation of the SEL signal establishes a phase-based relationship between the clock domain of the sending IC and the clock domain of the receiving IC.

As discussed above in the section entitled "Description of the Related Art", in the prior art the orientation of the signal SEL was provided by a master IC. While the master IC worked well, programming it required extra simulation steps and subsequent debugging. The present invention eliminates the need for a master IC, and allows integrated circuits designed in accordance with the present invention to "discover" the proper orientation of the select signal.

Figure 6:
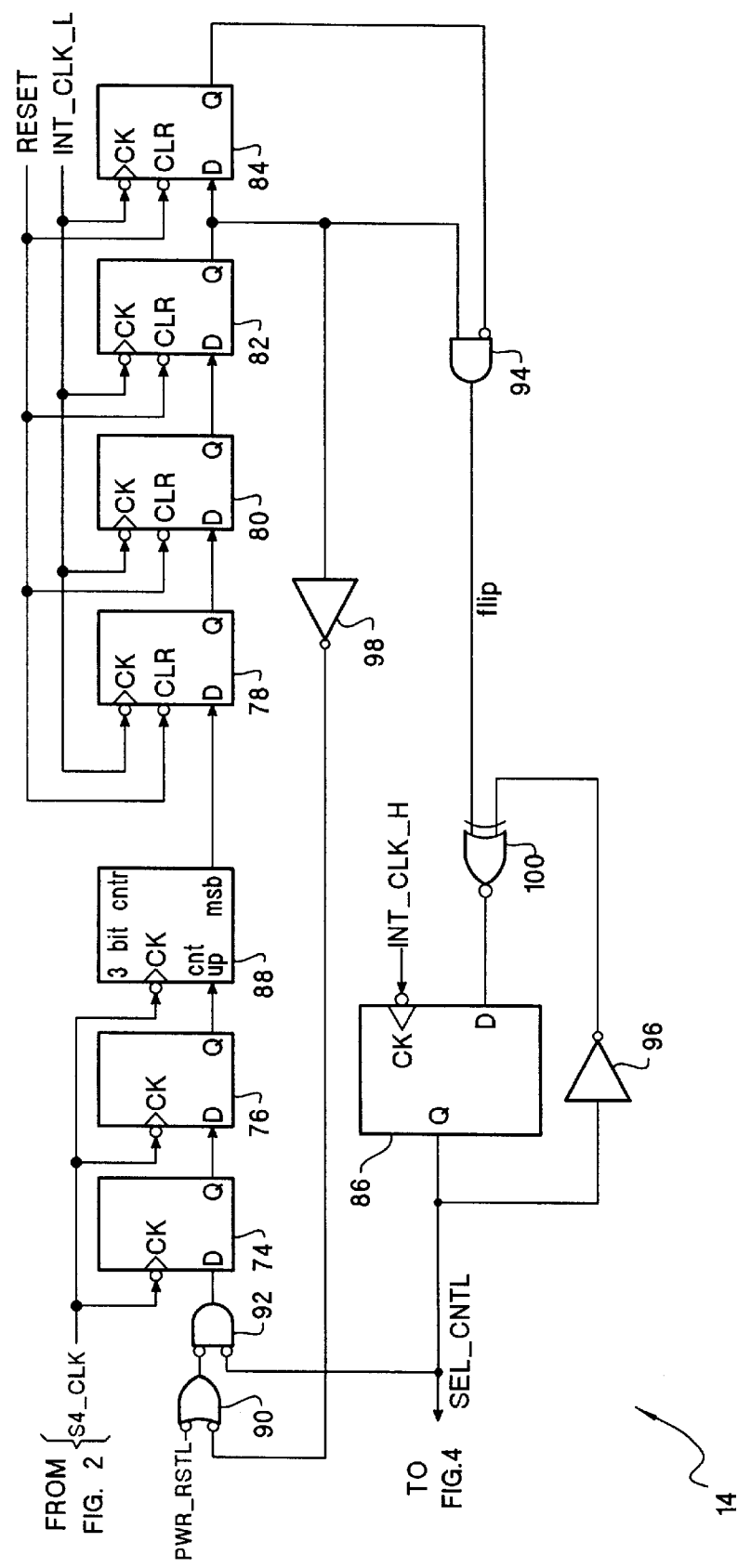
FIG. 6 is a block diagram showing a portion of the receiving IC that detects a phased-based relationship between the clock domains of the sending and receiving ICs and generates a select signal used by the circuit shown in FIG. 4.

FIG. 6 is a block diagram showing the portion of IC 14 that generates the SEL_CNTL signal suppled to flip flop 56 of FIG. 4, which in turn generates the SEL signal that is provided to multiplexors 52 and 54, as described above. The portion of IC 14 shown in FIG. 6 includes flip flops 74, 76, 78, 80, 82, 84, and 86, 3-bit up/down counter 88, OR gate 90 (which has inverting inputs), AND gate 92 (which has inverting inputs), AND gate 94 (which has an inverting input on the input connected to flip flop 84), inverters 96, and 98, and exclusive-OR gate 100.

There are two signals shown in FIG. 2 that are first presented in this Figure. The signal PWR_RSTL is a reset signal that is asserted as a "0" when the system is first powered up. After the power supplies have reached stable voltage levels and after the clock provided by clock generator 16 has been running for a sufficient period of time, the signal PWR_RSTL is deasserted and becomes "1". The other signal is the RESET signal. The RESET signal is asserted as a "1" when the system is first powered up, and remains high for a period of time after the PWR_RSTL signal is deasserted and becomes "1". After a sufficient period of time, the signal RESET is deasserted and becomes "0", and IC 14 begins "normal" operation. The RESET signal may also be asserted and deasserted at a later time to reset system 10.

The orientation of the SEL signal in FIG. 4 is determined during the period of time between the deassertion of the PWR_RSTL signal and the deassertion of the RESET signal. Once the RESET signal is deasserted, it is important that the orientation of the SEL signal not change because during so would disrupt the round robin scheme that is used to receive data from sending IC 12.

The signal FLIP from AND gate 94 will normally be "0". When the FLIP signal is "0" XOR gate 94 will act as a buffer and provide the output of inverter 96 to the D input of flip flop 86. Since the input of inverter 96 is connected to the Q output of flip flop 86, flip flop will simply function as a toggle that switches state every falling edge of the signal INT_CLK_H. The signal SEL_CNTL is produced at the Q output of flip flop 86, which in turn is used by flip flop 56 in FIG. 4 to produce the SEL signal.

As discussed above, the signal SEL can have one of two possible orientations. Accordingly, when system 10 of FIG. 1 is powered up, the signal SEL will either have the correct orientation or the incorrect orientation. If the orientation is correct, the SLIP signal will not be asserted and flip flop 86 will continue to produce the signal SEL_CNTL. However, if the orientation is incorrect, the signal FLIP will be asserted during one single falling edge of the signal INT_CLK_H. This will cause XOR gate 100 to act as an inverter for one cycle, which in combination with inverter 86 will effect a passthrough from output Q of flip flop 86 to input D of flip flop 86 for one cycle. Accordingly, the signal SEL_CNTL will shift one cycle resulting in the correct orientation of the SEL signal.

The circuit shown in FIG. 6 determines whether to toggle the orientation of the SEL signal by comparing the signal S4_CLK from FIG. 2 with the signal SEL_CNTL. The circuit will be described in detail below with respect to two situations. In one situation, it will be clear that the orientation must be toggled. In the other orientation, it will clear that the orientation is correct.

However, before considering how these two situation, first consider what happens when the falling edge of the signal S4_CLK is aligned with the falling edge of the signal INT_CLK_H. This situation defines the threshold point at which the decision to either toggle or not toggle the orientation of the SEL signal is made. While the circuit includes 3-bit counter 88 to integrate out jitter (which will be described in greater detail below), for now assume that when the falling edge of the signal S4_CLK is aligned with the falling edge of the signal INT_CLK_H the circuit may select either orientation. And as will be seen shortly, in this situation it does not matter which orientation is selected.

Figure 7:
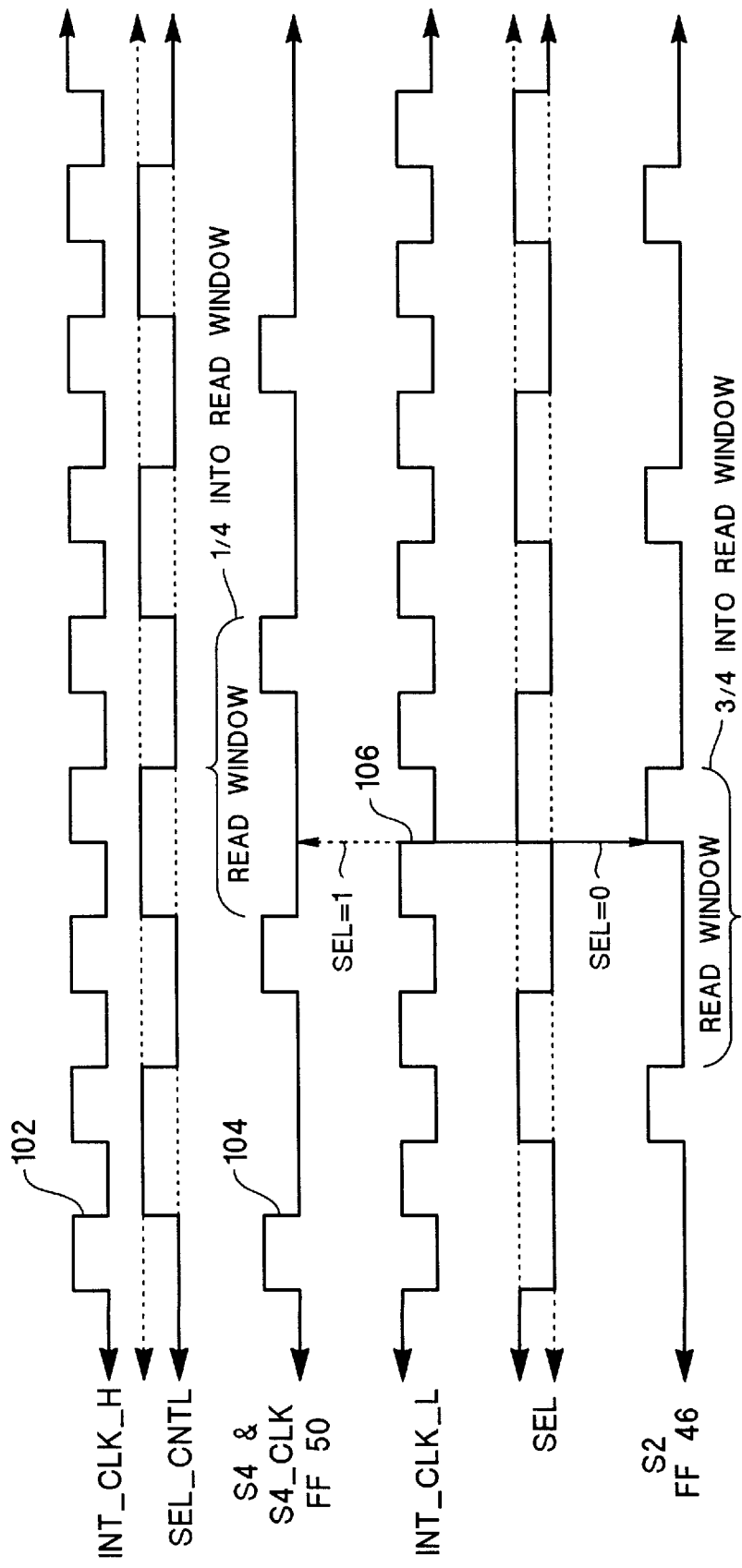
FIG. 7 is a timing diagram that shows timing relationships between some of the signals present in the circuits of FIGS. 2, 4, and 6 when a falling edge of a particular signal in the clock domain of the sending IC is aligned with a falling edge of a particular signal in the clock domain of the receiving IC.

FIG. 7 is a timing diagram that illustrates how the circuits in FIGS. 2, 4, and 6 function when the falling edge of the signal S4_CLK is aligned with the falling edge of the signal INT_CLK_H. Note that falling edge 102 of signal INT_CLK_H is aligned with falling edge 104 of signal S4_CLK. Accordingly, the signal SEL_CNTL will assume one of the two possible orientations. In FIG. 7, one orientation is shown with a solid line, while the other orientation superimposed as a dotted line. The signal SEL_CNTL is synchronized with the falling edge of the signal INT_CLK_H. In FIG. 4, the signal SEL_CNTL is provided to flip flop 56 which is clocked by the signal INT_CLK_L and produces the signal SEL. Accordingly, the signal SEL is a copy of the signal SEL_CNTL, but delayed by ½ of a cycle of the signals INT_CLK_H or INT_CLK_L. The signal SEL is shown in FIG. 7, with one orientation shown as a solid line and the other orientation superimposed as a dotted line.

Now assume that flip flop 58 is reading a data bit at falling edge 106 of signal INT_CLK_L. The signal SEL will have one of the two possible orientations, and therefore will either be "0" or "1". If SEL="1", then multiplexor 54 will select flip flop 50 to provide the data bit. The read window of flip flop 50 is shown in FIG. 7. Note that flip flop 58 will read the data bit from flip flop 50 of the way into the read window of flip flop 50. Now assume that the signal SEL has the other orientation and is "0". Multiplexor 54 will select flip flop 46 to provide the data bit. The read window of flip flop 46 is shown in FIG. 7. Note that flip flop 58 will read the data bit from flip flop 46 ¾ of the way into the read window of flip flop 46.

FIG. 7 illustrate the worst case situation. The data bit will be read either ¼ or ¾ of the way into the read window. However, this is still a very stable read because ¼ of the read window is equal to ½ of a cycle of the signals INT_CLK_L and INT_CLK_H. Any other alignment of the falling edge of signal S4_CLK and the falling edge of signal INT_CLK_H will move the read point more toward the center of the read window. Accordingly, the present invention will always read flip flops 44, 46, 48, and 50 at least ¼ and no more than ¾ of the way into the read windows of the flip flops.

Now assume that the circuit shown in FIG. 6 must toggle the orientation of the select signal. First, consider what happens when system 10 is first powered up. The clocks are running, the signal PWR_RSTL is "0", and the signal RESET is "1". While PWR_RSTL is "0", the output of OR gate 90 will be "1" and the output of AND gate 92 will be "0". Accordingly, a "0" will propagate through flip flops 74 and 76, and 3-bit counter 88 will count down to "000". Eventually the most significant bit (MSB) of counter 88 will become "0" and this value will propagate through flip flops 78, 80, 82, and 84. At this point, the signal FLIP will be "0".

Now assume that system 10 has been powered up for a sufficient period and the signal PWR_RSTL is deasserted and becomes "1". At this point, the output of flip flop 82 is "0", the output of inverter 98 is "1" and the output of OR gate 90 "0". Accordingly, AND gate 92 will invert the signal SEL_CNTL and the result will be clocked into flip flop 74 at the falling edge of the signal S4_CLK. If signal SEL_CNTL is "1" when this happens, the orientation of signal SEL is correct and does not need to be toggled. However, assume that SEL_CNTL is "0" and the orientation of SEL needs to be toggled. The output of AND gate 92 will be "1", and this value will be clocked into flip flop 74 at the falling edge of the signal S4_CLK.

Since SEL_CNTL and S4_CLK are phase independent, the possibility of metastable behavior exists if the falling edge of the signal S4_CLK is close to the falling edge of the signal INT_CLK_H. Flip flop 76 solves this problem. Accordingly, a "1" gets clocked into flip flop 76 at the next falling edge of the signal S4_CLK and is presented to the CNT UP input of 3-bit counter 88.

The purpose of 3-bit counter 88 is to integrate out any jitter in the signal if the falling edge of the signal S4_CLK is close to the falling edge of the signal INT_CLK_H. In the discussion of FIG. 7 above, it was shown that the orientation of the SEL signal does not matter if the falling edge of the signal S4_CLK is aligned with the falling edge of the signal INT_CLK_H. However, assume that the edges are close and 10% of the time the incorrect orientation is detected at flip flop 74. It would still be desirable for the circuit to determine that the orientation is correct. Counter 88 addresses this problem by requiring a net sum of four incorrect detections before toggling the orientation. Accordingly, after the CNT UP input of counter 88 has been "1" at the falling edge of S4_CLK a net sum of four times, the MSB output of counter 88 becomes "1".

Because S4_CLK and INT_CLK_L are phase independent, flip flops 78 and 80 are provided to eliminate the possibility of metastable behavior. Therefore, after the MSB output of counter 88 becomes "1", this value will propagate through flip flops 78 and 80. Note that at this point, the RESET signal is "1", so the CLEAR inputs of flip flops 78, 80, 82, and 84 are not asserted.

When the value "1" propagates from flip flop 80 to flip flop 82, the output of inverter 98 will become "0". At this point, the flip flops "upstream" from flip flop 82 and counter 88 are most likely each providing a "1" at their outputs. While these values propagate through to flip flop 82, inverter 98 generates a "0" that quiesce the phase detection circuit by blocking the SEL_CNTL signal at AND gate 92 until after the orientation has been toggled, and counter 88 begins counting down toward "000".

When the first "1" propagates into flip flop 82, for one cycle of the signal INT_CLK_L the output of flip flop 82 will be "1" and the output of flip flop 84 will be "0". The outputs of flip flops 82 and 84 are presented to AND gate 94, which also first inverts the output of flip flop 84. Accordingly, the signal FLIP is asserted for one cycle of the signal INT_CLK_L at the output of AND gate 94.

When the signal FLIP is asserted, XOR gate 100 becomes an inverter for one cycle. XOR gate 100 in combination with inverter 96 effects a passthrough from the Q output to the D input of flip flop 86 for one cycle. Accordingly, the orientation of the signal SEL_CNTL (as well as the orientation of the signal SEL in FIG. 4) will be toggled. Now the signal SEL_CNTL will be "1" at the falling edge of S4_CLK.

Since the signal FLIP is only asserted when the output of flip flop 82 is "1" and the output of flip flop 84 is "0", FLIP will not be asserted as the remainder of "1" values propagate through flip flop 84. Nor will FLIP be asserted when "0" propagate through flip flops 82 and 84.

When a "0" propagates to flip flop 82, signal SEL_CNTL will no longer be blocked at AND gate 92 by the output of inverter 98 flowing through OR gate 90. However, the signal SEL_CNTL will now be "1" at the falling edge of S4_CLK, so values of "0" will continue to propagate through flip flops 74, 76, 78, 80, 82, and 84 and counter 88. Accordingly, the circuit has toggled the orientation of the signal SEL to select the proper read windows as illustrated in FIGS. 5 and 7.

In view of the discussion above, where the orientation of the signal SEL is toggled, the discussion of the situation where SEL has the proper orientation is trivial. When the signal PWR_RSTL is deasserted and becomes "1", values of "0" have propagated through flip flops 74, 76, 78, 80, 82, and 84 and counter 88, as described above. Since SEL has the proper orientation, the signal SEL_CNTL will be "I" at the falling edge of S4_CLK, so values of "0" will continue to propagate through flip flops 74, 76, 78, 80, 82, and 84 and counter 88. Accordingly, the signal FLIP will never be asserted and the orientation will not be toggled.

Note that as system 10 warms up and stabilizes, it is possible (though unlikely) that the orientation of the SEL signal may change several times before the RESET signal is deasserted. However, once RESET is deasserted, it is essential that the orientation not change to prevent the round robin scheme from being disrupted. This is ensured by routing the RESET signal to the CLR inputs of flip flops 78, 80, 82, and 84. Once the RESET signal is deasserted and becomes "0", the output of flip flops 78, 80, 82, and 84 will always be "0". However, if flip flop 82 contains a "1" and flip flop 84 contains a "0" when RESET is deasserted, one final toggle of the orientation will be processed properly. Also note that if the RESET signal is later asserted and deasserted to "warm-boot" system 10, the circuit shown in FIG. 6 will again validate, and if required, toggle the orientation of the SEL signal.

A typical IC may communicate with several other ICs using a plurality of data busses and strobe signal lines. The phase detection and clock generation circuitry shown in FIGS. 2 and 4 must be provided for each differential strobe signal line. Similarly, the circuitry shown in FIG. 4, which reads data bits from an IC pad, must be provided for each conductor of a data bus that arrives at an IC pad.

In summary, the present invention provides a simple and automatic way of determining a phase-based relationship between a strobe signal provided by a sending IC and the internal clock of a receiving IC, thereby facilitating the transfer of data from the clock domain of the sending IC to the clock domain of the receiving IC. By eliminating the master IC used in the prior art, the component count is reduced, I/O pin count is reduced (or I/O pins become available for other functions), circuit board trace routing is simplified, simulation steps required during design can be eliminated, and system debugging is simplified, thereby decreasing time to market and reducing cost.

Although the present invention has been described with reference to preferred embodiments, workers skilled in the art will recognize that changes may be made in form and detail without departing from the spit and scope of the invention.

What is claimed is:

1. A method of determining an orientation of a select signal that is used to route data from flip flops configured in a round robin scheme and clocked by signals in a clock domain of a sending IC to one or more flip flops clocked by signals in a clock domain of a receiving IC comprising:
   generating intermediate clock signals for the flip flops configured in the round robin scheme from a strobe signal provided by the sending IC;
   generating the select signal;
   comparing a phase of a signal derived from one or more of the intermediate clock signals with a phase of the select signal; and
   toggling the orientation of the select signal if the select signal does not have a correct phase relationship with respect to the intermediate clock signals.

2. The method of claim 1 wherein there are four flip flops configured in the round robin scheme.

3. The method of claim 1 wherein comparing a phase of one or more of the intermediate clock signals with a phase of the select signal includes waiting for a power-on reset signal to be deasserted.

4. The method of claim 1 wherein toggling the orientation of the select signal if the select signal does not have a correct phase relationship with respect to the intermediate clock signals comprises delaying the select signal by ½ a cycle of the select signal.

5. The method of claim 1 and further comprising locking the orientation of the select signal after a reset signal has been deasserted, thereby preventing the select signal from being toggled while the reset signal is deasserted.

6. The method of claim 1 wherein there are two flip flops clocked by signals in a clock domain of a receiving IC and configured to read data routed from the flip flops configured in the round robin scheme.

7. A method of transferring data from the clock domain of a sending IC to the clock domain of a receiving IC comprising:
   determining an orientation of a select signal that is used to route data from flip flops configured in a round robin scheme and clocked by signals in a clock domain of a sending IC to one or more flip flops clocked by signals in a clock domain of a receiving IC comprising:
      generating intermediate clock signals for the flip flops configured in the round robin scheme from a strobe signal provided by the sending IC;
      generating the select signal;
      comparing a phase of a signal derived from one or more of the intermediate clock signals with a phase of the select signal; and
      toggling the orientation of the select signal if the select signal does not have a correct phase relationship with respect to the intermediate clock signals;
   clocking each incoming data bit into one of the flip flops configured in the round robin scheme;
   using the select signal to route outputs of one or more flip flops configured in the round robin scheme to the one or more flip flops clocked by signals in a clock domain of a receiving IC when the one or more flip flops configured in the round robin scheme have valid read windows.

8. The method of claim 7 wherein there are four flip flops configured in the round robin scheme.

9. The method of claim 7 wherein comparing a phase of one or more of the intermediate clock signals with a phase of the select signal includes waiting for a power-on reset signal to be deasserted.

10. The method of claim 7 wherein toggling the orientation of the select signal if the select signal does not have a correct phase relationship with respect to the intermediate clock signals comprises delaying the select signal by ½ a cycle of the select signal.

11. The method of claim 7 and further comprising locking the orientation of the select signal after a reset signal has been deasserted, thereby preventing the select signal from being toggled while the reset signal is deasserted.

12. A circuit for determining a proper orientation of a select signal that is used to route data from flip flops configured in a round robin scheme and clocked by signals in a clock domain of a sending IC to one or more flip flops clocked by signals in a clock domain of a receiving IC comprising:

a plurality of flip flops coupled to each other and a strobe signal provided by the sending IC, with the plurality of flip flops configured to generate intermediate clock signals from a strobe signal provided by the sending IC;

a plurality of logic gates coupled to the intermediate clock signals and the strobe signal, the plurality of logic gates configured to produce a plurality of round robin clock signals from the intermediate clock signals and the strobe signal;

a select signal generator that generates a select signal in the clock domain of the receiving IC;

a phase detection circuit coupled to a signal related to the select signal and a signal derived from one of the round robin clocks, wherein the phase detection circuit compares a signal provided by the select signal generator and a signal derived one or more of the plurality of round robin clock signals to determine assert a flip signal if the select signal does not have a correct orientation; and an orientation toggle circuit coupled to the phase detection circuit, for toggling the orientation of the select signal when the flip signal is asserted.

13. The circuit of claim 12 wherein the first plurality of flip flops comprises four flip flops.

14. The circuit of claim 12 wherein the phase detection circuit includes a power-on circuit that blocks generation of the flip signal until a power-on reset signal has been deasserted.

15. The circuit of claim 12 wherein the select signal generator comprises a flip flop clocked by an internal clock of the receiving IC and having an inverted output coupled to an input, and the orientation toggle circuit comprises a logic gate in the path between the output and input of the flip flop, wherein the logic gate effects a ½ cycle passthrough when the flip signal is asserted, thereby toggling the orientation of the select signal.

16. The circuit of claim 12 wherein the phase detection circuit includes reset circuit that locks the orientation of the select signal after a reset signal has been deasserted, thereby preventing the select signal from being toggled while the reset signal is deasserted.

17. The circuit of claim 12 wherein the phase detection circuit includes a counter that prevents the flip signal from being asserted until after detecting a net sum of incorrect orientations of the select signal.

18. A circuit contained within a receiving IC, for clocking data from a clock domain of a sending IC to a clock domain of the receiving IC, the circuit comprising:

a first plurality of flip flops configured in a round robin scheme, with each flip flop of the first plurality of flip flops coupled to a single data input pad;

a second plurality of flip flops coupled to each other and a strobe signal provided by the sending IC, with the plurality of flip flops configured to generate intermediate clock signals from a strobe signal provided by the sending IC;

a plurality of logic gates coupled to the intermediate clock signals and the strobe signal, the plurality of logic gates configured to produce a plurality of round robin clock signals from the intermediate clock signals and the strobe signal, with each round robin clock signal coupled to one of the first plurality of flip flops;

one or more third flip flops clocked by a clock signal in the clock domain of the receiving IC;

a select signal generator that generates a select signal in the clock domain of the receiving IC;

one or more multiplexors coupled to the select signal, the first plurality of flip flops, and the one or more third flip flops, for routing data from the first plurality of flip flops to the one or more third flip flops during valid read windows of the first plurality of flip flops;

a phase detection circuit coupled to a signal related to the select signal and a signal derived from one of the round robin clocks, wherein the phase detection circuit compares a signal provided by the select signal generator and a signal derived one or more of the plurality of round robin clock signals to determine assert a flip signal if the select signal does not have a correct orientation; and an orientation toggle circuit coupled to the phase detection circuit, for toggling the orientation of the select signal when the flip signal is asserted.

19. The circuit of claim 18 wherein the first and second plurality of flip flops each comprise four flip flops.

20. The circuit of claim 18 wherein the phase detection circuit includes a power-on circuit that blocks generation of the flip signal until a power-on reset signal has been deasserted.

21. The circuit of claim 18 wherein the select signal generator comprises a flip flop clocked by an internal clock of the receiving IC and having an inverted output coupled to an input, and the orientation toggle circuit comprises a logic gate in the path between the output and input of the flip flop, wherein the logic gate effects a ½ cycle passthrough when the flip signal is asserted, thereby toggling the orientation of the select signal.

22. The circuit of claim 18 wherein the phase detection circuit includes reset circuit that locks the orientation of the select signal after a reset signal has been deasserted, thereby preventing the select signal from being toggled while the reset signal is deasserted.

23. The circuit of claim 18 wherein the phase detection circuit includes a counter that prevents the flip signal from being asserted until after detecting a net sum of incorrect orientations of the select signal.

* * * * *